United States Patent [19]

Trombley et al.

[11] Patent Number: 4,958,609
[45] Date of Patent: Sep. 25, 1990

[54] FUEL INJECTION TIMING CONTROL FOR A CRANKCASE SCAVENGED TWO-STROKE ENGINE

[75] Inventors: Douglas E. Trombley, Warren; Kenneth J. Buslepp, Utica; Cathy C. Lillie; Marcel R. Wancket, both of Mt. Clemens, all of Mich.

[73] Assignee: General Motors Corporation, Detroit, Mich.

[21] Appl. No.: 451,834

[22] Filed: Dec. 18, 1989

[51] Int. Cl.⁵ .................. F02D 41/04; F02M 51/00
[52] U.S. Cl. .................... 123/478; 123/494; 123/73 C
[58] Field of Search ............ 123/73 C, 73 CB, 478, 123/492, 493, 494, 500, 501, 502, 503; 364/431.05

[56] References Cited

U.S. PATENT DOCUMENTS

| | | |
|---|---|---|
| 4,633,841 | 1/1987 | Matsuura et al. ............... 123/478 X |
| 4,706,632 | 11/1987 | Kasanami et al. .................. 123/492 |
| 4,711,218 | 12/1987 | Kabasin ............................ 123/492 |
| 4,729,362 | 3/1988 | Mori ................................. 123/492 |
| 4,773,373 | 9/1988 | Morita et al. .................... 123/494 X |
| 4,807,572 | 2/1989 | Schlunke ............................ 123/73 C |
| 4,823,755 | 4/1989 | Hirose et al. .................. 123/73 C X |
| 4,899,699 | 2/1990 | Huang et al. ...................... 123/73 C |
| 4,920,790 | 5/1990 | Stiles et al. ..................... 123/478 X |

Primary Examiner—Willis R. Wolfe
Attorney, Agent, or Firm—Howard N. Conkey

[57] ABSTRACT

A method and apparatus for improving the output torque response of a crankase scavenged, two-stroke engine to a change in throttle position by adjusting the conventional timing of cylinder fuel injection as a function of the position of the throttle and the time rate of change in the throttle position. Preferably, throttle position is measured with a potentiometer connected to the engine air intake throttle, and then filtered with a filter having a first order lag characteristic. Injection timing is advanced based upon a first predetermined schedule as a function of the measured throttle position. The difference between the measured and filtered throttle positions represents an indication of the time rate of change of throttle position and is employed to advance or retard timing in accordance with the second predetermined schedule, depending upon whether the difference is positive or negative, respectively. As a result, a substantially linear relationship is established between the output torque of the engine and the position of the throttle over its entire range of movement, and the amount of time required for the engine to respond to abrupt changes in throttle is reduced.

14 Claims, 3 Drawing Sheets

4,958,609

FUEL INJECTION TIMING CONTROL FOR A CRANKCASE SCAVENGED TWO-STROKE ENGINE

BACKGROUND OF THE INVENTION

This invention relates to the control of fuel injection timing in a direct injected, crankcase scavenged, two-stroke engine, and more particularly to a method and apparatus for improving the output torque response of such an engine to changes in throttle position.

In a conventional four-stroke internal combustion engine having direct fuel injection, engine output torque is customarily controlled indirectly by movement of the engine air intake throttle. Opening or closing of the throttle results in a corresponding increase or decrease in the mass of air flowing into the engine. An indication of the mass air flow is measured or derived, and used for controlling the amount of fuel delivered to the engine to maintain a predetermined air-fuel ratio. The quantity of fuel injected into each cylinder is controlled by varying the pulse width of signals enabling each cylinder injector. Since the output torque from a four-stroke engine is highly dependent upon the quantity of fuel injected, engine output varies in a linear fashion in relation to the position of the throttle, which is desirable in most applications. Additionally, this type of engine control typically reduces the time required for engine output to respond to an abrupt change in throttle position by adjusting fuel injector pulse width to modify the amount of fuel delivered to the engine during transient throttle movements.

For a direct injected, crankcase scavenged, two-stroke engine, fuel injection timing must be significantly retarded, toward the time of ignition, at lower operating speeds and light loading, in order to reduce emissions and improve fuel economy. As a result, the pressure within a cylinder at the time of injection is substantially increased because the compression stroke is nearing completion. This increased pressure acts in opposition to the injection of fuel, and prevents the injected fuel spray from penetrating deeply into the cylinder. As a consequence, changing fuel injector pulse width in an effort to vary cylinder fueling has a minimal effect on engine output torque at low engine speeds and light loading. Thus, if conventional control techniques are applied to the two-stroke engine, the output torque will not vary linearly with throttle position. For approximately the first twenty-five percent of the throttle movement, corresponding to low speeds and light loading, there is little effect on engine output torque. In addition, the engine will be sluggish in responding to rapid opening or closing of the throttle, since adjustment of the injector pulse width to add or withhold extra fuel will not have an immediate effect on engine output power.

SUMMARY OF THE INVENTION

In accord with this invention, the fuel injection timing of a crankcase scavenged, two-stroke engine is adjusted to improve the response of engine output torque to a change in throttle position. This is accomplished by measuring throttle position, deriving an indication of the time rate of change in throttle position, and then adjusting the timing of engine fuel injection based upon the position of the throttle and the time rate of change in throttle position. Due to the operating characteristics of this type of two-stroke engine, small changes in the timing of cylinder fuel injection result in relatively large and rapid changes in engine output torque. As a consequence, the response of a two-stroke engine to changes in throttle position can be greatly improved by making relatively minor adjustments to conventional fuel injection timing, without significantly sacrificing engine fuel economy or increasing emissions.

According to one aspect of the invention, conventional fuel injection timing is advanced in conformance with a first predetermined schedule for increases in the measured throttle position, corresponding to opening of the throttle. Preferably this schedule advances the timing of fuel injection linearly from 0 to 20 degrees for the first twenty-five percent movement of the throttle and remains constant at 20 degrees of advance for the remainder of the throttle movement. As a result, engine output increases in a substantially linear fashion with increasing throttle position over the entire range of throttle movement, eliminating the unresponsiveness of the two-stroke engine at lower speeds and light loading.

As contemplated by another aspect of the invention, fuel injection timing is further adjusted in accordance with a second predetermined schedule as a function of the indicated time rate of change in throttle position. Due to the sensitivity of engine output torque to small changes in fuel injection timing, this aspect of the invention reduces the time required for engine output to respond to abrupt changes in throttle position. Preferably, a first order lag characteristic is used in filtering the measured throttle position to smooth abrupt transitions in throttle movement. An indication of the time rate of change in throttle position is then derived by subtracting the filtered throttle position from the measured throttle position. By adjusting fuel injection timing based upon this difference, the time required for engine output torque to respond to rapid throttle movement is decreased.

In one preferred embodiment of the invention, fuel injection timing is adjusted only when the time rate of change in throttle position is greater than zero, and the injection timing is advanced as a function of the magnitude of this rate. This embodiment of the invention is useful to improve the acceleration response of the two-stroke engine when the throttle is opened abruptly, and is suitable for situations where the engine is used to power a vehicle having an automatic type transmission.

In another preferred embodiment of the invention, fuel injection timing is advanced when the time rate of change in throttle position is greater than zero, and retarded when the time rate of change is less than zero. This embodiment is useful in situations where both rapid acceleration and deceleration are required in response to throttle movement, for example, when the engine is used to power a vehicle having a manual type transmission.

In implementing the present invention, preferably a potentiometer is attached to the air intake throttle to provide an engine control system with means for measuring the throttle position. Filtering the measured throttle position is accomplished by means of a digital filter, which is programmed into the engine control computer. Adjustments to conventional fuel injection timing are stored as lookup tables in computer memory as functions of measured throttle position and the difference between measured and filtered throttle positions. The engine control computer adds or subtracts the proper adjustments to the control variable representing the conventional timing of engine fuel injection. Consequently, the present invention has the advantage that implementation requires only minor software modifications to an existing computer engine control system and the addition of a potentiometer for measuring throttle position.

These and other aspects and advantages of the invention may be best understood by reference to the following detailed description of the preferred embodiments when considered in conjunction with the accompanying drawings.

DESCRIPTION OF THE PREFERRED EMBODIMENTS

Figure 1:
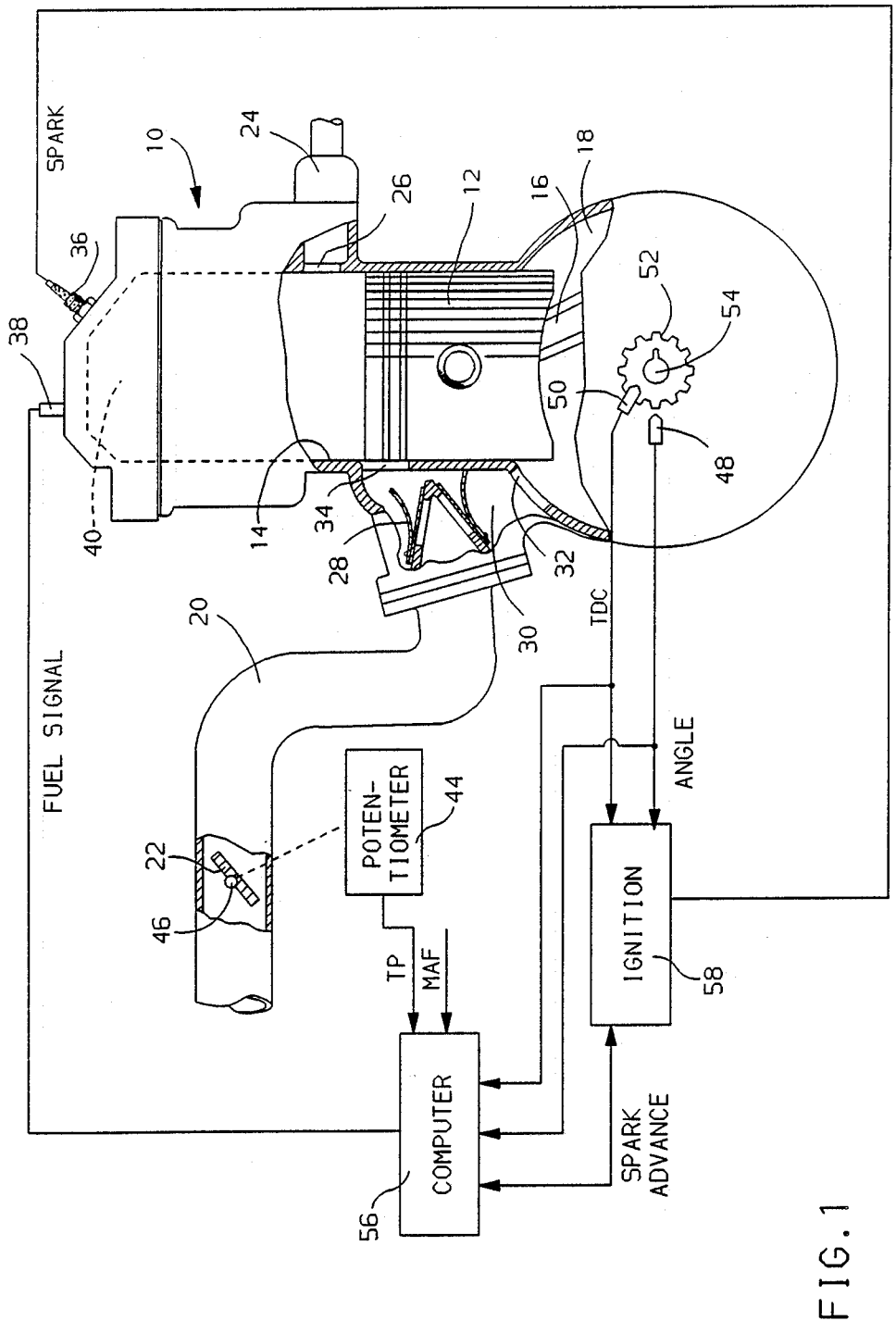
FIG. 1 is a schematic diagram of a crankcase scavenged two-stroke engine and a control system which includes the method for adjusting fuel injection timing according to the principles of the present invention.

Referring to FIG. 1, there is shown schematically a crankcase scavenged two-stroke engine, generally designated as 10, with a portion of the engine exterior cut away, exposing a cylinder 14. Piston 12 resides within the wall of cylinder 14, with rod 16 connecting piston 12 to a rotatable crankshaft, not shown, but disposed within crankcase chamber 18. Connected to engine 10 is an air intake manifold 20 and an exhaust manifold 24. Within intake manifold 20 is a throttle valve 22 mounted on a rotatable shaft 46, for controlling air flow to engine 10. Cylinder 14 communicates with exhaust manifold 24 through exhaust port 26 in the wall of cylinder 14. Intake manifold 20 communicates with cylinder 14 and crankcase chamber 18 through a reed valve checking mechanism 28, which opens into a common air transfer passage 30 linking crankcase port 32 with inlet port 34 in the wall of cylinder 14. Cylinder 14 is provided with a spark plug 36 and an electric solenoid driven fuel injector 38 projecting into combustion chamber 40.

A conventional control system exists for controlling the operation of engine 10, but for clarity, only those sensors, or their related signals, which are important in describing the present invention are shown in FIG. 1. The many other sensors typically used to obtain information regarding engine operating parameters for the complete engine control will not be discussed. In addition, the description of engine 10 and its accompanying control system will be limited specifically to cylinder 14, and can be easily extended and applied to other cylinders present in engine 10 by those skilled in the art of engine control.

Standard electromagnetic sensors 48 and 50 provide pulsed signals indicative of engine rotational angle (ANGLE) and the top dead center (TDC) position for cylinder 14, by respectively sensing the movement of teeth on ring gear 52 and disk 54, which are attached to the end of the engine crankshaft.

Computer 56 is a conventional digital computer used by those skilled in the art of engine control, and includes the standard elements of a central processing unit, random access memory, read only memory, analog-to-digital converter, input/output circuitry, and clock circuitry.

Using pulsed input signals ANGLE and TDC from standard electromagnetic sensors 48 and 50, computer 56 determines the angular position of the engine crankshaft. The crankshaft rotation from top dead center in cylinder 14 may be obtained by counting the number of pulses occurring in ANGLE, after the TDC pulse, then multiplying the number of counted pulses by the angular spacing between the edges of the teeth on ring gear 52. A resolution of one degree or less can be achieved, when ring gear 52 has at least 180 teeth, since electromagnetic sensor 48 produces an output pulse for both edges of each tooth on gear 52.

The engine rotational speed in revolutions per minute (RPM) may be obtained by counting the number of TDC pulses, which occur in a specified period of time, and then multiplying by the appropriate conversion constant. This computed rotational speed is stored as a variable SPEED in random access memory and is updated during execution of a main control program stored in computer 56.

The MAF input signal to computer 56 indicates the mass of air per cylinder flowing into engine 10. From the MAF input, computer 56 computes the proper amount of fuel per cylinder to be injected in maintaining the scheduled air-fuel ratio. The MAF signal can be derived from any suitable means known in the art, including a conventional mass air-flow sensor mounted within intake manifold 20, or alternatively, by computer processing of a signal produced by a pressure sensor placed within crankcase chamber 18. This later technique involves integration of the crankcase pressure over an interval of changing crankcase volume as disclosed in U.S. application Serial No. 377,383, filed July 10, 1989 by S. D. Stiles et al, co-pending with the present application and assigned to the same assignee.

Using the above inputs, and signals from other conventional sensors which have not been shown in FIG. 1, computer 56 performs the required computations, and provides an output FUEL SIGNAL to fuel injector 38. The FUEL SIGNAL consists of a pulse having a width that determines the time during which fuel injector 38 is operative and injecting fuel into cylinder 14. The width of the pulse is determined by computer 56, using standard calculations known in the art, to assure that the proper air-fuel mixture is delivered to cylinder 14. The leading edge of the output FUEL SIGNAL pulse determines the start of fuel injection into cylinder 14. Conventionally, computer 56 delivers the FUEL SIGNAL pulse at a time when the crankshaft angle of rotation from TDC in cylinder 14 is equal to the control variable FIT. FIT is the rotational angle in degrees after top dead center (ATDC) defining the start of cylinder fuel injection. The value of FIT is continuously updated during execution of the main control program by addressing a standard lookup table containing values of FIT stored as a function of engine rotational speed (SPEED), and engine loading as indicated by either the mass air per cylinder (MAF) or the fuel pulse width of the FUEL SIGNAL. The table of FIT values is obtained by standard engine mapping procedures on a dynamometer where emissions are minimized while improving fuel economy.

A SPARK ADVANCE signal, related to spark timing during the engine operating cycle, is determined by computer 56 and delivered to ignition system 58. The value for SPARK ADVANCE is determined by addressing another lookup table stored in computer memory, as described previously for fuel injection timing. Ignition system 58 generates a high voltage SPARK signal to fire spark plug 36 at the appropriate rotational angle, using the ANGLE, TDC, and SPARK ADVANCE inputs. Ignition system 58 may include a standard distributor or take any other appropriate form in the prior art.

The operation of engine 10 will now be briefly described based upon the cycle occurring in cylinder 14. During the upstroke, piston 12 moves from its lowest position in cylinder 14 toward top dead center. During the upward movement of piston 12, air inlet port 34 and exhaust port 26 are closed off from the combustion chamber 40, and thereafter, air is inducted into crankcase chamber 18 through reed valve 28. Air in combustion chamber 40 is compressed above piston 12, and at the appropriate time before top dead center, fuel injector 38 is enabled by the FUEL SIGNAL pulse supplied by computer 56. The resulting air-fuel mixture is ignited when spark plug 36 fires near the top of the stroke in cylinder 14. As combustion is initiated, piston 12 begins the downstroke, decreasing the volume of crankcase chamber 18 and the inducted air within it, due to closure of valve reed valve 28. Toward the end of the downstroke, piston 12 uncovers exhaust port 26 to release the combusted fuel, followed by uncovering of the inlet port 34, enabling compressed air within the crankcase chamber 18 to flow through the air transfer passage 30 into cylinder 14. The cycle begins anew when piston 12 reaches the lowest point in cylinder 14.

At lower operating speeds and light loading, the fuel injection timing of two-stroke engine 10 must be retarded significantly, toward the time of ignition within cylinder 14, in order to reduce emissions and improve fuel economy. As a result, the pressure within cylinder 14 at the time of injection is substantially increased because piston 12 is nearing the completion of its compression stroke. This increased pressure acts in opposition to the injection of fuel, and prevents the injected fuel spray from penetrating deeply into the cylinder. As a consequence, the conventional practice of increasing fuel injector pulse width as the throttle is opened will have minimal effect on the output torque of the engine, resulting in lack of engine response for approximately the first twenty-five percent of throttle movement. In addition, the engine will be sluggish in responding to rapid throttle movements, if fuel injector pulse width is varied in an attempt to add or withhold extra fuel during rapid throttle transitions.

Due to the particular operating characteristics of two-stroke engine 10, small changes made in the conventional timing of cylinder fuel injection result in relatively large and rapid changes in engine output torque. The present invention recognizes and is directed toward utilizing this behavior to improve overall engine response by substantially linearizing engine output torque over the range of possible throttle movement and reducing the time required for the engine torque to respond to an abrupt movement of the throttle. This is accomplished by effectuating comparatively small adjustments to conventional fuel injection timing as a function of throttle position and the time rate of change in throttle position. This provides a simple and convenient way to markedly improve the performance of a computer controlled two-stroke engine, without significantly increasing emissions or sacrificing fuel economy. Implementation of the invention requires only minor software changes in the programming of computer 56 and the addition of a standard potentiometer 44, which is coupled to throttle shaft 46 for measuring throttle position and providing a corresponding input signal TP to computer 56.

Figure 3:
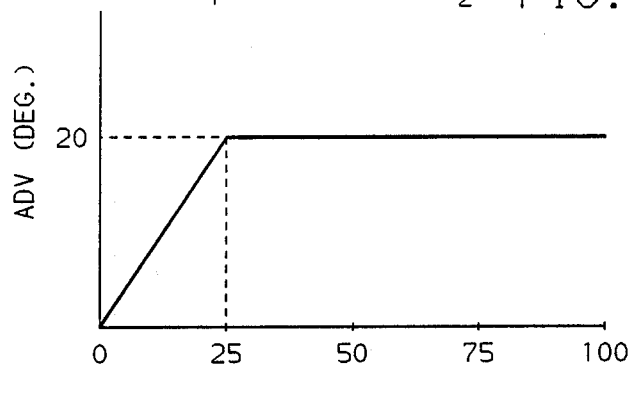
FIGS. 3 and 4 represent the respective schedules for fuel injection timing adjustments based upon measured throttle position, and the difference between the measured and filtered throttle positions.
Figure 5:
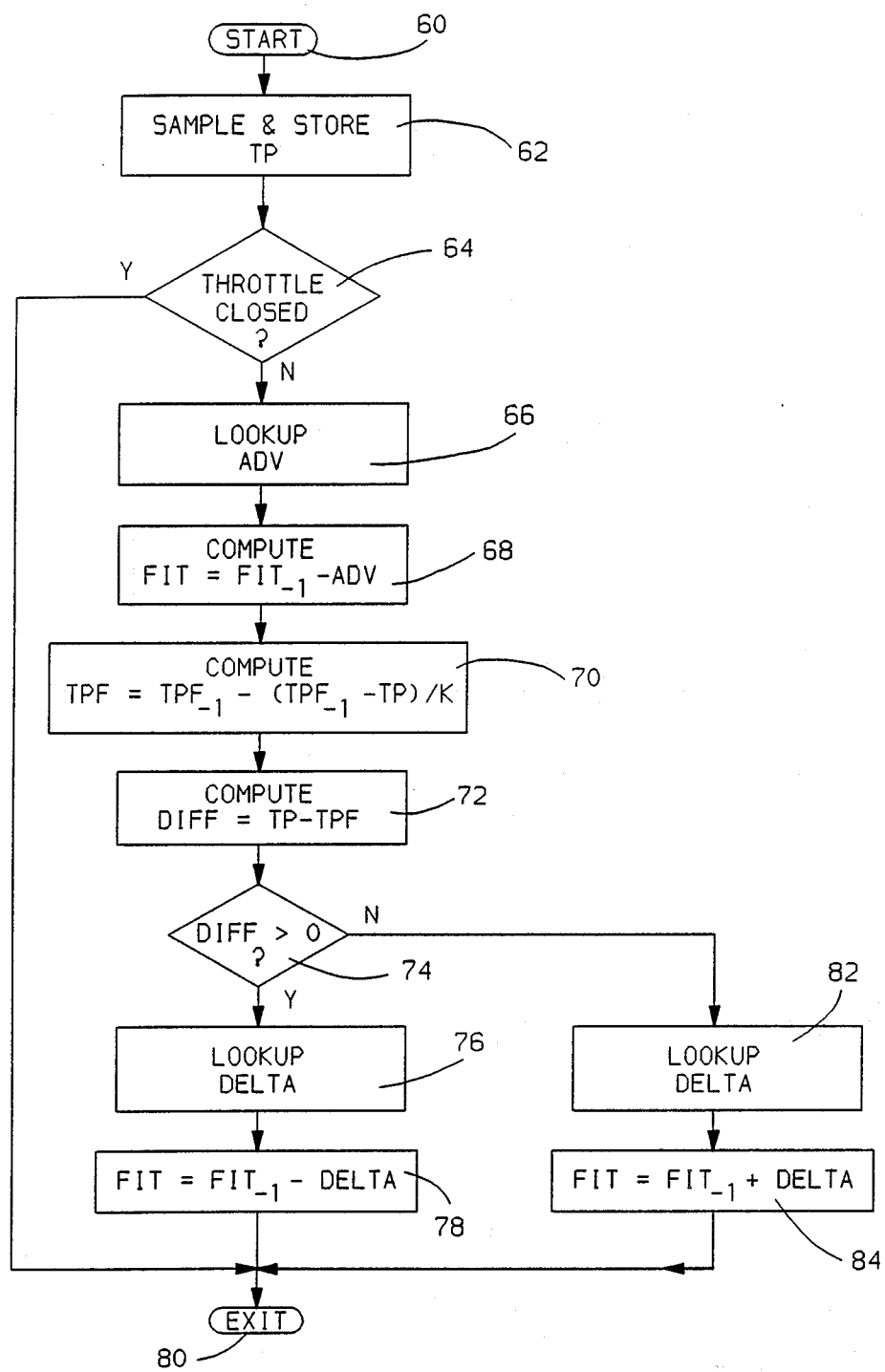
FIG. 5 is a flow diagram representative of the program instructions executed by the computer of FIG. 1 in performing adjustments to engine fuel injection timing in accordance with the present invention.

Referring now to FIG. 5, there is shown a simplified flow diagram illustrating a routine executed by computer 56 in adjusting the timing of cylinder fuel injection to improve engine response to throttle movement in accordance with the present invention. After engine startup, all counters, flags, registers, and timers within computer 56 are first initialized. After preliminary initialization, computer 56 continuously executes a looped main engine control program. The routine illustrated in FIG. 3 is included as part of the main control program and is executed approximately every 8 milliseconds as the computer 56 performs its control functions.

The routine is entered at point 60, and proceeds to step 62 where the measured throttle position TP is sampled and stored in computer random access memory for later use.

Next, decision step 64 is executed to determine whether the throttle is closed and the engine is operating at idle. If the value of TP is equal to zero, indicating the throttle is closed, then fuel injection timing is not adjusted and the routine is exited at point 80. However, if the throttle is not closed, the program proceeds to the next step 66 in the routine. At step 66, a value for the variable ADV is looked up in a table permanently stored in memory as a function of the percentage of measured throttle position TP, in relation to its maximum value. Values for ADV are predetermined and scheduled as a function of the percentage of TP as illustrated in the graph presented in FIG. 3.

Next at step 68, the conventional fuel injection timing FIT is advanced by the value of ADV found at step 66. The new value for fuel injection timing FIT is computed by subtracting the value of ADV from the previous value of fuel injection timing indicated by $FIT_{-1}$. By advancing injection timing in accordance with the schedule depicted in FIG. 3, the engine is made responsive to change in throttle position at low operating speeds and light loading, where increasing fuel injection pulse width has no substantial effect. The engine output then responds in a substantially linear fashion with changing throttle position over the entire range of throttle movement. The magnitude of ADV is relatively small in comparison to timing changes which significantly affect engine emissions and fuel consumption at lower speed and light loading, so improving engine output response to throttle movement in this manner does not significantly sacrifice fuel economy or increase emissions.

In steps 70 and 72, an indication of the time rate of change in throttle position is obtained. At step 70, a filtered value TPF for the measured throttle position TP is obtained by employing a digital filter having a first order lag characteristic. The value for filtered throttle position is computed according to the expression $$TPF = TPF_{-1} - (TPF_{-1} - TP)/K,$$

where K is a constant, $TPF_{-1}$ is the value of filtered throttle position determined and stored during the immediately preceding pass through step 70. In the preferred embodiment, the constant K=16 for a sampling interval of approximately 8 milliseconds. Other forms of digital filters may be employed to filtering the measured throttle position, or even an analog type low pass filter located external to computer 56.

At step 72, a value for DIFF, the difference between the measured and filtered throttle positions, is computed according to $$DIFF = TP - TPF.$$

Figure 2:
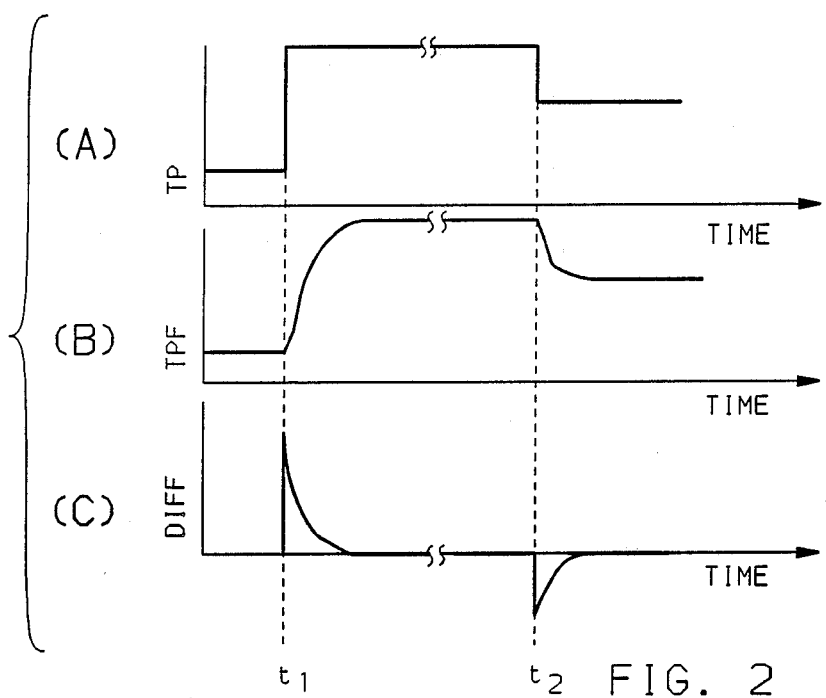
FIG. 2(A)–(C) depict time histories of measured throttle position, filtered throttle position, and the difference between measured and filtered throttle positions with abrupt throttle movements.

The measured throttle position, filtered throttle position, and the difference between measured and filtered throttle positions, during abrupt movements of the throttle, are illustrated by the time histories shown in FIG. 2(A)–(C), respectively. At time $t_1$, the measured throttle position TP increases rapidly due to an abrupt step increase in position. This abrupt step increase is not present in the filtered throttle response TPF due to the smoothing action of the digital filter. The difference between the measured and filtered throttle positions DIFF represents an indication of the time rate of change of the throttle position. The difference DIFF is the digital equivalent of passing the analog signal representing measured throttle position through a conventional analog differentiating circuit. The maximum positive amplitude of DIFF depends upon the rate of change in TP and it decays rapidly to zero after the throttle transient. For the abrupt decrease in throttle position at time $t_2$, DIFF has a negative amplitude indicating a negative time rate of change in TP. Other known method may be used in obtaining an indication of the time rate of change in throttle position, such as using the difference between TP, the current value for measured throttle position, and $TP_{-1}$, which represents the value of TP at step 62 during the immediately preceding pass through the routine of FIG. 5.

At the next step 74 in the routine, a decision is made as to whether DIFF is greater than zero. If DIFF is positive, indicating a positive time rate of change in throttle position, the routine proceeds to step 76. If DIFF is less than or equal to zero, indicating a negative time rate of change or no change in throttle position, the routine proceeds to step 82.

Figure 4:
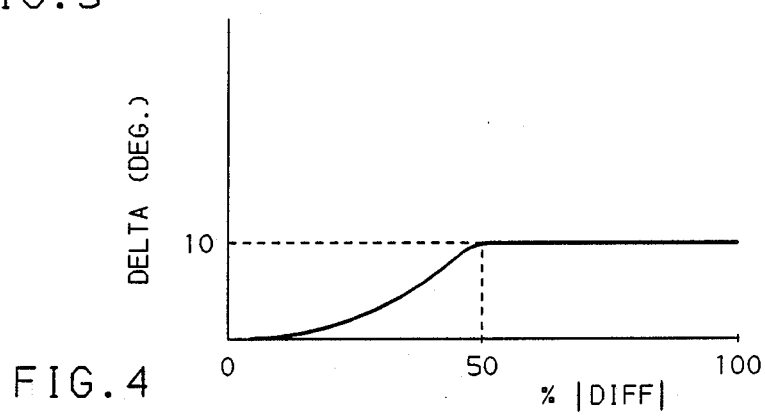

Step 76 is executed if DIFF is greater than zero, and a value for DELTA is looked up in a table permanently stored in the memory as a function of DIFF. In the preferred embodiment, the values for DELTA are scheduled as a percentage of the absolute value of DIFF as illustrated by FIG. 4. The value of DELTA increases as the absolute value of DIFF increases up to approximately 50 percent of its maximum value, then DELTA remains constant at 10 degrees for further increases in the absolute value of DIFF.

Referring again to FIG. 5, and in particular to step 78, fuel injection timing FIT is again advanced by subtracting the value of DELTA, found at step 76, from the previous value of injection timing indicated by $FIT_{-1}$. Here, the value of $FIT_{-1}$ is that found for FIT at step 68. Thus, the engine response to abrupt increases in the throttle position is improved by advancing fuel injection timing in accordance with the schedule illustrated in FIG. 4, for the short period of time after the transient throttle movement when DIFF is greater than zero. After the timing adjustment, the routine is exited at point 80.

If the value of DIFF at step 74 is not greater than zero, then step 82 in the routine is executed and a value of DELTA is found in the same lookup table as described previously at step 76, again as a function of the absolute value of DIFF. However, at step 84, the injection timing is retarded by adding the value of DELTA found at step 82 to $FIT_{-1}$, the previous value of fuel injection timing established at step 68. Retarding injection timing by the amount DELTA, improves engine response to an abrupt decrease in throttle position. After the timing adjustment, the routine is exited at point 80.

In the preferred embodiment described above, fuel injection timing is advanced for positive values of DIFF, associated with abrupt increases in throttle position, and retarded for negative values of DIFF, associated with abrupt decreases in throttle position. This embodiment is useful where engine 10 is employed to power a vehicle having a manual transmission. There, it is desirable that the engine respond rapidly not only to abrupt increases in throttle, but also to abrupt decreases in throttle, to accommodate the manual shifting of the transmission.

In another preferred embodiment of the invention, the timing of fuel injection is not retarded for negative values of DIFF. This requires removal of the steps 82 and 84 in the routine illustrated in FIG. 5, so that when DIFF is not greater than zero at decision step 74, the routine is directly exited at point 80. This embodiment of the invention is useful where engine 10 is employed to power a vehicle having an automatic transmission. There, the engine does not have to respond as rapidly to abrupt decreases in throttle to accommodate shifting of the automatic transmission.

The aforementioned description of the preferred embodiments of the invention is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. In a crankcase scavenged two-stroke engine having timed direct cylinder fuel injection and a movable throttle valve for regulating engine intake air, a method for improving the response of engine output torque to a change in throttle position comprising:
   measuring throttle position;
   deriving an indication of the time rate of change in throttle position; and
   adjusting fuel injection timing as a function of measured throttle position and time rate of change in throttle position.

2. The method of claim 1, wherein fuel injection timing is adjusted in accordance with a first predetermined schedule as a function of the measured throttle position.

3. The method of claim 2, wherein fuel injection timing is adjusted in accordance with a second predetermined schedule as a function of the derived indication of time rate of change in throttle position.

4. The method of claim 3, wherein fuel injection timing is advanced when the derived time rate of change in throttle position is positive.

5. The method of claim 3, wherein fuel injection timing is advanced when the derived time rate of change in throttle position is positive and is retarded when the derived time rate of change in throttle position is negative.

6. The method of claim 4, further including the steps of:
filtering measured throttle position with a filter having a first order lag characteristic; and
subtracting the filtered throttle position from the measured throttle position, whereby the resulting difference is indicative of the time rate of change in throttle position.

7. The method of claim 5, further including the steps of:
filtering measured throttle position with a filter having a first order lag characteristic; and
subtracting the filtered throttle position from the measured throttle position, whereby the resulting difference is indicative of time rate of change in throttle position.

8. In a crankcase scavenged two-stroke engine having timed, direct cylinder fuel injection and a movable throttle valve for regulating engine intake air, an apparatus for improving the response of engine output torque to a change in throttle position comprising:
means for measuring throttle position;
means for deriving an indication of the time rate of change in throttle position; and
means for adjusting fuel injection timing as a function of measured throttle position and the time rate of change of throttle position.

9. The apparatus of claim 8, wherein fuel injection timing is adjusted in accordance with a first predetermined schedule as a function of the measured throttle position.

10. The apparatus of claim 9, wherein fuel injection timing is adjusted in accordance with a second predetermined schedule as a function of the derived indication of time rate of change in throttle position.

11. The apparatus of claim 10, wherein fuel injection timing is advanced when the derived time rate of change in throttle position is greater than zero.

12. The apparatus of claim 10, wherein fuel injection timing is advanced when the derived rate of change in throttle position is positive and is retarded when the derived time rate of change in throttle position is negative.

13. The apparatus of claim 11, further including:
means for filtering measured throttle position with a filter having a first order lag characteristic; and
means for subtracting the filtered throttle position from the measured throttle position, whereby the resulting difference is indicative of the time rate of change in throttle position.

14. The apparatus of claim 12, further including:
means for filtering measured throttle position with a filter having a first order lag characteristic; and
means for subtracting the filtered throttle position from the measured throttle position, whereby the resulting difference is indicative of time rate of change in throttle position.

* * * * *